(12) United States Patent
Iwamoto et al.

(10) Patent No.: US 9,139,741 B2
(45) Date of Patent: Sep. 22, 2015

(54) ANTIFOULING PAINT COMPOSITION AND ANTIFOULING PAINT

(75) Inventors: Akio Iwamoto, Hiroshima (JP); Eri Kawai, Aichi (JP)

(73) Assignee: MITSUBISHI RAYON CO., LTD., Tokyo (JP)

( * ) Notice: Subject to any disclaimer, the term of this patent is extended or adjusted under 35 U.S.C. 154(b) by 0 days.

(21) Appl. No.: 13/989,675

(22) PCT Filed: Nov. 22, 2011

(86) PCT No.: PCT/JP2011/076857
§ 371 (c)(1),
(2), (4) Date: May 24, 2013

(87) PCT Pub. No.: WO2012/070552
PCT Pub. Date: May 31, 2012

(65) Prior Publication Data
US 2013/0245179 A1    Sep. 19, 2013

(30) Foreign Application Priority Data

Nov. 25, 2010 (JP) ................................ 2010-262941

(51) Int. Cl.
*C08F 220/06* (2006.01)
*C09D 4/00* (2006.01)
*C09D 5/16* (2006.01)

(52) U.S. Cl.
CPC ............ *C09D 5/1637* (2013.01); *C08F 220/06* (2013.01); *C09D 4/00* (2013.01); *C09D 5/1612* (2013.01)

(58) Field of Classification Search
CPC .. C08F 220/06; C09D 5/1637; C09D 5/1612; C09D 4/00

USPC .......................................... 523/122; 524/376
See application file for complete search history.

(56) References Cited

U.S. PATENT DOCUMENTS

| | | | | |
|---|---|---|---|---|
| 3,705,137 | A | * 12/1972 | Kuwahara et al. | ............... 526/62 |
| 2002/0011177 | A1 | 1/2002 | Yamamori et al. | |
| 2007/0272119 | A1 | 11/2007 | Ichinose et al. | |

FOREIGN PATENT DOCUMENTS

| | | |
|---|---|---|
| JP | 58 174453 | 10/1983 |
| JP | 58 183762 | 10/1983 |
| JP | 4 353576 | 12/1992 |
| JP | 6 9919 | 1/1994 |
| JP | 7 331122 | 12/1995 |
| JP | 10 310710 | 11/1998 |
| JP | 2000 319590 | 11/2000 |
| JP | 2002 241676 | 8/2002 |
| JP | 2010 1395 | 1/2010 |
| JP | 2010 77250 | 4/2010 |
| WO | 2005 116155 | 12/2005 |
| WO | 2011 080821 | 7/2011 |

OTHER PUBLICATIONS

International Search Report issued Feb. 28, 2011 in PCT/JP11/076857 filed Nov. 22, 2011.

* cited by examiner

*Primary Examiner* — Nathan M Nutter
(74) *Attorney, Agent, or Firm* — Oblon, McClelland, Maier & Neustadt, L.L.P.

(57) ABSTRACT

Disclosed here is a method for producing an antifouling paint composition using metal-containing polymer particles, an organic solvent and acrylic polymer (P) that is soluble in the organic solvent. According to the method, an antifouling paint composition is obtained, which is useful for producing a high-solid antifouling paint having excellent storage stability along with a shorter drying time because of capillary action among the polymer particles.

14 Claims, No Drawings

ANTIFOULING PAINT COMPOSITION AND ANTIFOULING PAINT

TECHNICAL FIELD

The present invention relates to an antifouling paint composition and antifouling paint.

BACKGROUND ART

Marine organisms such as barnacles, teredos and algae attached to vessels and offshore structures cause a reduction in the speed of a vessel, corrosion of materials and the like. Antifouling paints have been developed to prevent such attachment of marine organisms. The following types are known among antifouling paints: collapsible antifouling paints, where the resin of coating surfaces collapses unevenly in seawater for elution of antifouling agents; and self-polishing antifouling paints, where the resin of coating surfaces gradually decomposes uniformly through hydrolysis for elution of antifouling agents. In addition, from environmental viewpoints, high-solid antifouling paints have been studied recently as a way of reducing the amount of volatile organic compounds (VOC).

For example, patent publication 1 describes a high-solid self-polishing antifouling paint that includes metal-containing acrylic resin. Patent publication 2 describes an antifouling paint that includes vinyl resin particles with a metal ester bond, and also a method for producing a high-solid paint by adding resin particles without resulting in a higher paint viscosity.

PRIOR ART PUBLICATION

Patent Publication

[Patent Publication 1] Japanese Laid-Open Patent Publication 2002-241676
[Patent Publication 2] Japanese Laid-Open Patent Publication S63-56510

SUMMARY OF THE INVENTION

Problem(s) to be Solved by the Invention

However, according to the method described in patent publication 1, the solvent in a coating film is hard to volatilize, resulting in a longer drying time for the film. Also, using the method described in patent publication 2, since the vinyl resin particle composition is not optimized, agglomeration or precipitation of vinyl resin particles may occur in the paint, causing insufficient storage stability of the paint.

The present invention was carried out to solve the problems described above. Namely, the objective of the present invention is to provide an antifouling paint composition suitable for producing a high-solid antifouling paint that exhibits excellent storage stability of the paint and a shorter drying time for a coating film because of capillary action among polymer particles.

Solution(s) to the Problem(s)

A first aspect of the present invention relates to an antifouling paint composition that includes metal-containing polymer particles, an organic solvent and acrylic polymer (P) that is soluble in the organic solvent.

A second aspect of the present invention relates to metal-containing polymer particles formed by polymerizing ethylenically unsaturated monomer mixture (M) that includes the following: 8 to 65% by mass of divalent or higher-valent metal-containing ethylenically unsaturated monomer (a1); 0.5 to 8% by mass of carboxyl group-containing ethylenically unsaturated polymer (a2); and 27 to 91.5% by mass of other ethylenically unsaturated polymer (a3).

Effect(s) of the Invention

An antifouling paint composition suitable for producing a high-solid antifouling paint is obtained according to an embodiment of the present invention. Such an antifouling paint has excellent storage stability, and the drying time for a coating film is shorter due to capillary action among polymer particles.

MODE TO CARRY OUT THE INVENTION

An antifouling paint composition according to an embodiment of the present invention includes metal-containing polymer particles (hereinafter referred to as polymer particles (A)), an organic solvent, and acrylic polymer (P) that is soluble in the organic solvent. Because of polymer particles (A), during the drying process for paint that contains the antifouling paint resin composition, the solvent in the paint volatilizes easily through capillary action among the polymer particles. Thus, the drying time of the paint improves. Accordingly, after a vessel is painted, problems such as swelling of coating surfaces during the removal of blocks are prevented. Furthermore, because of polymer particles (A), the amount of solid content in the paint increases without resulting in a higher viscosity of the paint, and a high-solid antifouling paint is obtained.

[Metal-Containing Polymer Particles (Polymer Particles (A))]

Polymer particles (A) are present as the particles in an antifouling paint composition, and are preferred to have a divalent or higher-valent metal ester structure. With a divalent or higher-valent metal ester structure, hydrolysis properties are enhanced, and thus antifouling performance is well achieved. Examples of polymer particles (A) having a divalent or higher-valent metal ester structure are magnesium salts, calcium salts, zinc salts, copper salts, aluminum salts, titanate or the like of acid group-containing acrylic copolymers, for example. Especially, zinc salts of acid group-containing acrylic copolymers are preferred from the viewpoint of transparency characteristics.

In addition, polymer particles (A) are preferred to be metal-containing polymer particles that include the following: 8 to 65% by mass of divalent or higher-valent metal-containing ethylenically unsaturated monomer (a1); 0.5 to 8% by mass of carboxyl group-containing ethylenically unsaturated polymer (a2); and 27 to 91.5% by mass of other ethylenically unsaturated polymer (a3). Such particles are formed by polymerizing ethylenically unsaturated monomer mixture (M) (hereinafter referred to as monomer mixture (M)), which includes 8 to 65% by mass of divalent or higher-valent metal-containing ethylenically unsaturated monomer (a1); 0.5 to 8% by mass of carboxyl group-containing ethylenically unsaturated polymer (a2); and 27 to 91.5% by mass of other ethylenically unsaturated polymer (a3).

Divalent or Higher-Valent Metal-Containing Ethylenically Unsaturated Monomer (a1)

Because of divalent or higher-valent metal-containing ethylenically unsaturated monomer (a1) in monomer mixture (M), obtained polymer particles (A) undergo hydrolysis in seawater, resulting in excellent self-polishing characteristics of a coating film formed using a paint containing the antifouling paint resin composition.

The percentage of divalent or higher-valent metal containing ethylenically unsaturated monomer (a1) in monomer mixture (M) is preferred to be 8 to 65% by mass. When the percentage is 8% or greater by mass, hydrolysis progresses well and excellent antifouling performance is achieved. Moreover, obtained polymer particles (A) have lower solubility in solvents, thus leading to a reduced viscosity of resin ingredients. Accordingly, the amount of a diluent necessary for an antifouling paint is reduced so that the amount of VOC in the paint decreases. Also, when the percentage is 65% or lower by mass, the water resistance of a coating film is excellent. The percentage is more preferred to be 15% or greater by mass so that the solid content of the paint increases without resulting in a higher paint viscosity, and to be 55% or less by mass from the viewpoint of the water resistance of the coating film.

Divalent or higher-valent metal-containing ethylenically unsaturated monomer (a1) is obtained as follows, for example: method (I) for reacting an inorganic metal compound and a carboxyl group-containing ethylenically unsaturated monomer; and method (II) for reacting an inorganic metal compound, a carboxyl group-containing ethylenically unsaturated monomer, and an organic acid with no polymerizable functional group in the molecule. Well-known methods are used for such reactions in a temperature range at which unsaturated monomers will not polymerize, for example, 100° C. or lower.

A list of inorganic metal compounds is as follows, for example: metal oxides such as magnesium oxide, aluminum oxide, calcium oxide, titanium oxide, copper oxide and zinc oxide; metal hydroxides such as magnesium hydroxide, aluminum hydroxide, calcium hydroxide, titanium hydroxide, copper hydroxide and zinc hydroxide; and metal salts such as magnesium salt, aluminum salt, calcium salt, titanium salt, copper salt and zinc salt. Considering the storage stability of monomer (a1) and the transparency characteristics of copolymer particles (A) to be obtained, zinc compounds and magnesium compounds are preferred, and zinc oxides are especially preferred.

As for carboxyl group-containing ethylenically unsaturated monomers to be reacted with inorganic metal compounds, they are not limited specifically, and any ethylenically unsaturated monomer is used as long as it includes at least one carboxyl group or carboxylic acid anhydride group in the molecule. For example, the following are listed: carboxyl group-containing ethylenically unsaturated monomers such as (meth)acrylic acid, fumaric acid, maleic acid, itaconic acid and sorbic acid; carboxylic acid anhydride group-containing ethylenically unsaturated monomers such as itaconic anhydride, and maleic anhydride; and dicarboxylic monoesters such as monoalkyl itaconate, and monoalkyl maleate. Among those, (meth)acrylic acids are preferred, since copolymerization with other monomers progresses well.

In addition, as for organic acids with no polymerizable functional group in the molecule, the following are listed: acetic acid, monochloroacetic acid, monofluoroacetic acid, propionic acid, octylic acid, 2-ethylhexyl acid, versatic acid, isostearic acid, caproic acid, caprylic acid and the like. One or more of the above are appropriately selected. Especially, octylic acid is preferable from the viewpoint of the storage stability of monomer (a1).

As for divalent or higher-valent metal-containing ethylenically unsaturated monomer (a1) to be produced by the above method (I), the following are listed, for example: (meth)acrylate divalent metal salts such as magnesium (meth)acrylate, calcium (meth)acrylate, zinc (meth)acrylate, and copper (meth)acrylate; (meth)acrylate trivalent metal salts such as aluminum (meth)acrylate; and (meth)acrylate tetravalent metal salts such as titanate (meth)acrylate. Among them, zinc (meth)acrylate is preferred from the viewpoint of transparency characteristics of polymer (A).

As for divalent or higher-valent metal-containing ethylenically unsaturated monomer (a1) obtained by the above method (II), the following are listed, for example: divalent metal salts such as magnesium propionate (meth)acrylate, calcium propionate (meth)acrylate, zinc propionate (meth)acrylate, copper propionate (meth)acrylate, magnesium octylate (meth)acrylate, calcium octylate (meth)acrylate, zinc octylate (meth)acrylate, copper octylate (meth)acrylate magnesium versatate (meth)acrylate, calcium versatate (meth)acrylate, zinc versatate (meth)acrylate, copper versatate (meth)acrylate, magnesium isostearate (meth)acrylate, calcium isostearate (meth)acrylate, zinc isostearate (meth)acrylate, and copper isostearate (meth)acrylate; trivalent metal salts such as aluminum dipropionate (meth)acrylate, aluminum propionate di(meth)acrylate, aluminum dioctylate (meth)acrylate, aluminum octylate di(meth)acrylate, aluminum diversatate (meth)acrylate, aluminum versatate di(meth)acrylate, aluminum diisostearate (meth)acrylate, and aluminum isostearate di(meth)acrylate; and tetravalent metal salts such as titanium tripropionate (meth)acrylate, titanium dipropionate (meth)acrylate, titanium propionate tri(meth)acrylate, titanium trioctylate (meth)acrylate, titanium dioctylate di(meth)acrylate, titanium octylate tri(meth)acrylate, titanium triversatate (meth)acrylate, titanium diversatate di(meth)acrylate, titanium versatate tri(meth)acrylate, titanium triisostearate (meth)acrylate, titanium diisostearate di(meth)acrylate, and titanium isostearate tri(meth)acrylate.

Furthermore, in the present embodiment, it is an option to use two or more types of divalent or higher-valent metal-containing ethylenically unsaturated monomers (a1) obtained by the above methods. It is also an option to produce monomer (a1) in reactions under conditions that include ethylenically unsaturated monomer (a3). Moreover, when inorganic metal compounds and carboxyl group-containing compounds react, such reactions are preferred to take place in the presence of water so that the fluidity of reaction solutions is maintained. The percentage of water is preferred to be 0.01 to 30% by mass of the reactant.

Carboxyl Group-Containing Ethylenically Unsaturated Monomer (a2)

When carboxyl group-containing ethylenically unsaturated monomer (a2) is included in monomer mixture (M), the dispersion of polymer particles (A) in a paint are enhanced, improving the storage stability of the paint.

The content of carboxyl group-containing ethylenically unsaturated monomer (a2) in monomer mixture (M) is preferred to be 0.5 to 8% by mass. When the percentage is 0.5% by mass or greater, the storage stability of the paint is excellent. In addition, when the percentage is 8% by mass or less, the storage stability of the paint as well as its water resistance is excellent. The percentage is more preferred to be 2 to 4% by mass from the viewpoint of the storage stability of the paint.

As long as an ethylenically unsaturated monomer contains at least one carboxyl group or carboxylic acid anhydride group in the molecule, carboxyl group-containing ethylenically unsaturated monomer (a2) is not limited specifically, and the same carboxyl group-containing ethylenically unsaturated monomers are used as those listed for producing metal-containing ethylenically unsaturated monomer (a1).

Other Ethylenically Unsaturated Monomer (a3)

In the present embodiment, other ethylenically unsaturated monomer (a3), in addition to above-described monomers (a1) and (a2), is preferred to be included in monomer mixture (M) at 27 to 91.5% by mass. When monomer (a3) is included at 27% by mass or greater, the adhesion and hydrolysis properties of a coating film are enhanced, thus improving antifouling effects. In addition, when the monomer is contained at 91.5% by mass or less, since the solubility of obtained polymer particles (A) in organic solvents decreases, the solid content of paint increases without resulting in a higher viscosity of the paint. Accordingly, a high-solid antifouling paint is obtained. It is more preferable when the percentage is in a range of 41 to 83% by mass.

When reactions to obtain divalent or higher-valent metal-containing ethylenically unsaturated monomer (a1) have taken place under conditions that includes other ethylenically unsaturated monomer (a3), and the mixture of monomer (a1) and monomer (a3) obtained through such reactions is used to prepare monomer mixture (M), the amount of that monomer (a3) is included in the above-described percentage of monomer (a3).

As for other ethylenically unsaturated monomer (a3), it is not limited specifically, as long as it is neither monomer (a1) nor monomer (a2), and is a monomer having an unsaturated double bond.

Specifically, (meth)acrylic acid ester monomers such as methyl (meth)acrylate, ethyl (meth)acrylate, 2-methoxyethyl (meth)acrylate, n-butyl (meth)acrylate, i-butyl (meth)acrylate, t-butyl (meth)acrylate, 2-ethylhexyl (meth)acrylate, lauryl (meth)acrylate, stearyl (meth)acrylate, benzyl (meth)acrylate, phenyl (meth)acrylate, isobornyl (meth)acrylate, cyclohexyl (meth)acrylate, and glycidyl (meth)acrylate; hydroxyl group-containing (meth)acrylic acid ester monomers such as 2-hydroxyethyl (meth)acrylate, 2-hydroxypropyl (meth)acrylate, 2-hydroxy butyl (meth)acrylate, and 4-hydroxy butyl (meth)acrylate; adducts of hydroxyl group-containing (meth)acrylic acid ester monomers such as 2-hydroxyethyl (meth)acrylate and 2-hydroxypropyl (meth)acrylate with ethylene oxide, propylene oxide, γ-butyrolactone, ε-caprolactone, or the like; dimeric or trimeric hydroxyl group-containing (meth)acrylic acid ester monomers such as 2-hydroxyethyl (meth)acrylate, and 2-hydroxypropyl (meth)acrylate; (meth)acrylic acid ester monomers containing multiple hydroxyl groups such as glycerol (meth)acrylate; primary and secondary amino group-containing (meth)acrylic acid ester monomers such as butylaminoethyl (meth)acrylate, and (meth)acrylamide; amino group-containing (meth)acrylic acid ester monomers such as dimethyl aminoethyl (meth)acrylate, and diethyl aminoethyl (meth)acrylate; (meth)acrylamide monomers such as (meth)acrylamide, and N-butyl (meth)acrylamide; vinyl monomers such as styrene, a-methyl styrene, vinyl toluene, (meth)acrylonitrile, vinyl chloride, and vinyl acetate; allyl group-containing monomers such as allyl glycol, polyethylene glycol allyl ether, methoxy polyethylene glycol allyl ether, butoxypolyethylene glycol allyl ether, polypropylene glycol allyl ether, methoxy polypropylene glycol allyl ether, and butoxypolypropylene glycol allyl ether; and polyfunctional (meth)acrylate ester monomers such as ethylene glycol di(meth)acrylate, diethylene glycol di(meth)acrylate, triethylene glycol di(meth)acrylate, and allyl (meth)acrylate. From the viewpoint of self-polishing characteristics and stable solubility after coating, it is preferred to select a monomer having appropriate hydrophilic and hardness properties. For example, methyl (meth)acrylate is preferred. In addition, a combination of two or more of those monomers may be used.

[Polymerization Method for Polymer Particles (A)]

Polymer particles (A) are produced through polymerization in a solvent that does not dissolve polymer particles (A), using a well-known method such as suspension polymerization, emulsion polymerization, precipitation polymerization, or nonaqueous dispersion polymerization. For example, when suspension polymerization is used, monomer mixture (M), a dispersant, a polymerization initiator and a chain-transfer agent are added to an aqueous medium for suspension. Then, the suspension is heated for polymerization, and the suspension after polymerization is filtered, cleansed, dehydrated and dried. Accordingly, a granular polymer is produced.

The particle diameter of polymer particles (A) is preferred to be 1 to 20 μm, more preferably 1 to 10 μm. It is especially preferred to be 1 to 5 μm.

Dispersant

As for a dispersant for suspension copolymerization, a copolymer of alkali metal salt of sulfoalkyl (meth)acrylate and (meth)acrylic acid ester, alkali metal salt of polystyrene sulfonate, a copolymer of alkali metal salt of styrene sulfonic acid and (meth)acrylic acid ester, or the like may be used. Especially, it is preferred to select a copolymer of alkali metal salt of (meth)acrylate, alkali metal salt of sulfoalkyl (meth) acrylate and (meth)acrylic acid ester because of its excellent dispersion stability. The amount of a dispersant is not limited specifically, and 0.005 to 5 parts by mass based on 100 parts by mass of the monomer mixture is preferred.

When a suspension polymerization method is employed, inorganic electrolytes may also be used for enhancing dispersion stability during suspension polymerization. Inorganic electrolytes are not limited to any specific type; for example, sodium carbonate, potassium carbonate, sodium hydrogen carbonate, sodium sulphate, manganese sulphate and so forth, or a combination thereof, may be used.

Polymerization Initiator

The polymerization initiator to be used in suspension polymerization is not limited specifically, and the following are listed, for example: azo compounds such as 2,2'-azobis isobutyronitrile, 2,2'-azobis (2-methylbutyronitrile), 2,2'-azobis (2,4-dimethyl valeronitrile), dimethyl 2,2'-azobis isobutyrate, and 2,2'-azobis (2-methylpropionamidine) dihydrochloride; organic peroxides such as cumyl peroxy neodecanoate, 1,1,3,3-tetramethyl-butyl peroxy-2-ethylhexanoate, t-hexyl peroxy-2-ethylhexanoate, t-butyl peroxy-2-ethylhexanoate, diisopropylbenzene hydroperoxide, and cumene hydroperoxide; and inorganic peroxides such as hydrogen peroxide, potassium persulfate, sodium persulfate, and ammonium persulfate. Among them, the following are especially preferred, since they tend to have enhanced polymerization stability: 1,1,3,3-tetramethyl butyl peroxy-2-ethylhexanoate, t-hexyl peroxy-2-ethylhexanoate, and t-butyl peroxy-2-ethylhexanoate. A combination of two or more may be used. The amount of a polymerization initiator is not limited specifically, but it is preferred to use 0.05 to 10 parts by mass based on 100 parts by mass of the monomer mixture.

[Acrylic Polymer (P)]

Acrylic polymer (P) to be used for the present embodiment is a polymer which is soluble in the organic solvent contained in an antifouling paint composition, and is formed by polymerizing a monomer mixture that includes a (meth)acrylic monomer. The percentage of the (meth)acrylic monomer in the monomer mixture is preferred to be 50% by mass or greater.

Well-known (meth)acrylic monomers are used here. Considering self-polishing properties and stable solubility after coating, it is preferred to select a monomer having appropriate hydrophilic and hardness properties. Methyl (meth)acrylate or ethyl (meth)acrylate is preferred to be used. A preferred percentage in a (meth)acrylic monomer mixture is 1 to 50% by mass of methyl methacrylate, 40 to 80% by mass of ethyl methacryalte, or 1 to 20% by mass of 2-methoxyethyl acrylate.

Moreover, acrylic polymer (P) is preferred to have a divalent metal ester structure. By using acrylic polymer (P) with a divalent metal ester structure, antifouling agents elute when acrylic polymer (P) is gradually dissolved in seawater through hydrolysis. Accordingly, long-term antifouling effects are achieved.

As a method for introducing a divalent metal ester structure into acrylic polymer (P), it is an option to polymerize an ethylenically unsaturated monomer mixture having a divalent metal-containing ethylenically unsaturated monomer. Namely, as a specific method, polymerization is conducted using a (meth)acrylic monomer having a divalent metal ester structure. Alternatively, a (meth)acrylic monomer mixture containing (meth)acrylic acid may be polymerized, and then esterified with a divalent metal oxide or salt.

As for (meth)acrylic monomers having a divalent metal ester structure, the following are listed, for example: (meth)acrylate divalent metal salts such as magnesium (meth)acrylate, calcium (meth)acrylate, zinc (meth)acrylate, and copper (meth)acrylate; and organic acid-containing divalent metal salts such as magnesium propionate (meth)acrylate, calcium propionate (meth)acrylate, zinc propionate (meth)acrylate, copper propionate (meth)acrylate, agnesium octylate (meth)acrylate, calcium octylate (meth)acrylate, zinc octylate (meth)acrylate, copper octylate (meth)acrylate, magnesium versatate (meth)acyrlate, calcium versatate (meth)acrylate, zinc versatate (meth)acrylate, copper versatate (meth)acrylate magnesium isostearate (meth)acrylate, calcium isostearate (meth)acrylate, zinc isostearate (meth)acrylate, and copper isostearate (meth)acrylate. The percentage of a (meth)acrylic monomer having a divalent metal ester structure is preferred to be 1 to 60% by mass based on the entire monomer mixture used when polymerizing acrylic polymer (P).

The mean weight-average molecular weight (Mw) of acrylic polymer (P) is preferred to be 2000 to 20000, more preferably 2500 to 10000. When a mean molecular weight is 2000 or greater, the water resistance of a coating film tends to be enhanced. On the other hand, when a mean molecular weight is 10000 or smaller, the viscosity of a paint made from acrylic polymer (P) is suppressed from rising, making it easier to form a high-solid antifouling paint.

Acrylic polymer (P) is produced by a well-known solution polymerization method.

[Antifouling Paint Resin Composition]

The antifouling paint resin composition according to the present embodiment is obtained by mixing polymer particles (A) and acrylic polymer (P) using a well-known method. The antifouling paint resin composition includes the organic solvent used for solution polymerization of acrylic polymer (P). The organic solvent dissolves acrylic polymer (P).

As for specific examples of organic solvents, the following are listed: hydrocarbons such as toluene, xylene, ethylbenzene, cyclopentane, octane, heptane, cyclohexane and white spirit; ethers such as dioxane, tetrahydrofuran, ethylene glycol monomethyl ether, ethylene glycol monoethyl ether, ethylene glycol monobutyl ether, ethylene glycol dibutyl ether, diethylene glycol monomethyl ether, and diethylene glycol monoethyl ether; esters such as butyl acetate, propyl acetate, benzyl acetate, ethylene glycol monomethyl ether acetate, and ethylene glycol monoethyl ether acetate; ketones such as ethyl isobutyl ketone, and methyl isobutyl ketone; and alcohols such as n-butanol, propyl alcohol.

The ratio of polymer particles (A) is preferred to be high, considering the drying time and water resistance of a coating film, and to be low, considering the water resistance and adhesion of the coating film. The mass ratio of polymer particles (A) and acrylic polymer (P) is preferred to be 3/97 to 90/10, more preferably 10/90 to 70/30. These are the mass ratios of solid contents of polymers that exclude solvent ingredients.

The mass ratio of acrylic polymer (P) and an organic solvent is determined based on the solid content when solution polymerization is conducted, and it is generally 30/70 to 80/20, preferably 40/60 to 70/30.

[Antifouling Paint]

Since antifouling paint that contains the antifouling paint resin composition of the present embodiment has polymer particles (A), the solvent in the paint volatilizes easily when the paint is drying due to capillary action among the polymer particles. Thus, the drying time of the paint improves. Moreover, because of polymer particles (A), the solid content of the paint increases without resulting in a higher viscosity of the paint. Accordingly, a high-solid antifouling paint is obtained.

For the antifouling paint of the present embodiment, it is an option to add a silicone compound such as dimethylpolysiloxane or silicone oil, a fluoro-containing compound such as fluorocarbon, other additives such as antifouling agents, pigment and plasticizers, along with solvents and the like, so that coating surfaces are lubricated and bio-organisms are prevented from attaching to the surfaces. As for such solvents, the same organic solvents contained in the antifouling paint resin composition may be used. Those ingredients are mixed using a well-known method by a well-known mixer such as a ball mill, pebble mill, roller mill or sand grinding mill.

Examples of the present embodiment are shown in the following. The evaluation was conducted by the methods shown below. In the examples, "parts" means "parts by mass" and "%" means "% by mass."

[Storage Stability Test]

Antifouling paints were kept at a temperature of 25° C. for three days, a month and three months, and were visually observed respectively to determine whether the viscosity of paints had changed and whether agglomeration had occurred. The results were evaluated using the following criteria.

○: neither increased viscosity of paint nor agglomeration observed after a predetermined time Δ: minor agglomeration observed, but dispersed after the paint is stirred x: gelatinization or agglomeration of paint observed, and not dispersed after the paint is stirred

[Coating Consumption Test]

Test plates were formed using a rigid polyvinyl-chloride plate with a size of 50 mm×50 mm×2 mm (thickness), and prepared paints were applied by an applicator to have a dry film thickness of 120 μm. Then, after the test plates were left at room temperature (approximately 20° C.) and dried for a week, the thickness of the dry coating film was measured using a laser displacement sensor. Then, the test plates were attached to a rotary drum set in seawater, and the drum was rotated at a circumferential speed of 7.7 m/s (15 knots). Then, the thickness of the consumed coating was measured three months and six months respectively after antifouling paints were applied. The average monthly thickness of consumed coating is preferred to be at least 3.0 μm or greater.

[Water Resistance Test]

Test plates were prepared using a substrate made of a sandblasted steel plate with rust-preventing paint applied in advance, and prepared antifouling paints were applied to a dry film thickness of 120 μm. The test plates were immersed for a month in artificial seawater, dried for a week at a temperature of 20° C., and the coating surfaces were observed. The results are evaluated using the following criteria.

◯: no cracking or peeling observed

Δ: some cracking and peeling observed x: cracking and peeling observed on entire surface

[Coating Dryness Test (Pressure Test by Model Block)]

Test plates prepared the same as in the above water resistance test were dried at a temperature of 20° C. for a day, and a 50 mm×50 mm polyethylene sheet was placed on coated surfaces. Then, a 30 mm×30 mm model block was placed on the plates, which were pressurized by adding 40 kg for 20 minutes. The coating surfaces were observed after the model block was removed. The results were evaluated using the following criteria. If the antifouling paint has not dried well, the coating may deform notably when the model block is removed, and such situations are not preferred.

◯: trace of model block observed

Δ: vicinity of model block deformed; swelling observed on coating film x: vicinity of model block notably deformed; substantial swelling observed on coating film

[Cross-Cut Test]

Test plates prepared the same as in the above water resistance test were immersed in artificial seawater for a month and dried at a temperature of 20° C. for a week, then underwent cross-cut testing. Cross-cut testing was carried out as follows: Test plates were cut at an interval of 2 mm to a depth that reaches the substrate, and 25 cross-cut patterns of 2 mm² were formed; Sellotape (registered trademark) was placed on the cross-cut plates and immediately peeled. The peeled surfaces of the cross-cut plates were observed and evaluated using the following criteria.

◯: no peeling observed on cross-cut surfaces or corners of cross-cut patterns

Δ: peeling observed in 1 to 12 cross-cut patterns x: peeling observed in 13 to 25 cross-cut patterns

[Molecular Weight]

Gel Permeation Chromatography (GPC) (HLC-8220 made by Tosoh Corporation) was used for measurement. As for columns, TSK gel α-M (7.8 mm×30 cm made by Tosoh Corporation) and TSK guard column α (6.0 mm×4 cm made by Tosoh Corporation) were used. Calibration curves were prepared using F288/F128/F80/F40/F20/F2/A1000 (standard polystyrene made by Tosoh Corporation) and styrene monomers. N,N-dimethylformamide (DMF) solution in which 0.4% by mass of a polymer is dissolved is prepared. Molecular weights were measured using 100 μL of the DMF solution at 40° C. Mean weight-average molecular weights (Mw) were calculated in terms of standard polystyrene.

[Producing Mixture (X) Including Divalent or Higher-Valent Metal-Containing Ethylenically Unsaturated Monomer (A1)]

In a four-necked flask equipped with a cooler, thermometer, dripping funnel and mixer, the following were added as ethylenically unsaturated monomer (a3): 20 parts of polyethylene glycol allyl ether (brand name: "Uniox PKA 5001" made by NOF Corporation, hereinafter abbreviated as "Uniox PKA 5001"), 132.8 parts of methyl methacrylate (hereinafter abbreviated as "MMA") and 81 parts of zinc oxide. Then, the temperature was raised to 75° C. while the contents were stirred. Next, a mixture containing 86 parts of methacrylic acid, 72 parts of acrylic acid and 10 parts of water was dripped out in 3 hours through the dripping funnel at a constant speed. Then, the mixture was stirred for 2 hours and cooled to room temperature. Accordingly, mixture (X1) is obtained, which includes divalent metal-containing ethylenically unsaturated monomer (a1), namely, zinc (meth)acrylate produced by reacting zinc oxide and (meth)acrylic acid, and ethylenically unsaturated monomer (a3), namely, Uniox PKA 5100 and MMA.

Mixtures (X2) to (X4) were prepared using the same method as above, but containing their respective amounts of divalent or higher-valent metal-containing ethylenically unsaturated monomer (a1) and ethylenically unsaturated monomer (a3) as shown in Table 1.

TABLE 1

| | amount (part by mass) | | | | | | | | |
|---|---|---|---|---|---|---|---|---|---|
| | ethylenically unsaturated monomer (a3) | | carboxyl-containing ethylenically unsaturated monomer | | inorganic metal compound | | | organic acid | others |
| | PKA5001 | MMA | MAA | AA | ZnO | Al(OH)$_3$ | Ti(OH)$_4$ | octylic acid | water |
| X1 | 20.0 | 132.8 | 86.0 | 72.0 | 81.0 | — | — | — | 10.0 |
| X2 | 20.0 | 115.9 | 79.6 | 66.6 | 81.0 | — | — | 21.6 | — |
| X3 | 20.0 | 108.7 | 120.4 | 100.8 | — | 78.0 | — | 28.8 | — |
| X4 | 20.0 | 112.0 | 163.4 | 136.8 | — | — | 120.0 | 28.8 | — |

[Producing Acrylic Polymer (P1) with Divalent Metal Ester Structure]

In a four-necked flask equipped with a cooler, thermometer, dripping funnel and mixer, the following were added: 10 parts of propyleneglycol monomethyl ether (hereinafter abbreviated as "PGM"), 47.1 parts of xylene, and 4 parts of ethyl acrylate. Then, the temperature was raised to 100° C. while the contents were being stirred. Next, a mixture containing the following was dripped out in 6 hours through the dripping funnel at a constant speed: 62.6 parts of ethyl acrylate, 3 parts of 2-methoxyethyl acrylate, 32.7 parts of above-described mixture (X1) (18 parts of metal-containing ethylenically unsaturated monomer (a1), 1.6 parts of Uniox PKA 5001, 10.8 parts of MMA, and 2.3 parts of water), 12.4 parts of PGM, 1 part of a chain transfer agent (brand name: Nofmer MSD, made by NOF Corporation), 2.5 parts of AIBN (2,2'-azobis (isobutyronitrile), and 10 parts of AMBN (2,2'-azobis (2-methylbutyronitrile)).

After the above dripping was completed, a mixture of 0.5 parts of t-butylperoctoate and 5 parts of xylene was dripped out in 30 minutes. The mixture was further stirred for one and a half hours, and 5 parts of xylene was added. Accordingly, a transparent pale yellow solution of acrylic polymer (P1) having no insoluble substance was obtained at a solid content of 56.0% and a Gardner viscosity of Z1. The mean weight-average molecular weight (Mw) of the acrylic polymer (P1) was 3200.

[Producing Acrylic Polymer (P2)]

In a four-necked flask equipped with a cooler, thermometer, dripping funnel and mixer, 10 parts of PGM and 47.1 parts of xylene were added, and the temperature was raised to 100° C. while the contents were being stirred. Next, a transparent mixture containing the following was dripped out in 6 hours through the dripping funnel at a constant speed: 24.8 parts of methyl methacrylate, 70.3 parts of ethyl acrylate, 3.2 parts of 2-ethoxyethyl acrylate, 14.7 parts of PGM, 2.5 parts of AIBN, and 4 parts of AMBN.

After the above dripping was completed, a mixture of 0.5 parts of t-butylperoctoate and 5 parts of xylene was dripped out in 30 minutes. The mixture was further stirred for one and a half hours, and 5 parts of xylene was added. Accordingly, a transparent pale yellow solution of non-metal-containing acrylic polymer (P2) having no insoluble substance was obtained at a solid content of 55.4% and a Gardner viscosity of N. The mean weight-average molecular weight (Mw) of the acrylic polymer (P2) was 7000.

[Producing Dispersant]

In a polymerization apparatus equipped with a cooler, thermometer, dripping funnel and mixer, the following were added and stirred: 900 parts of deionized water, 60 parts of sodium 2-sulfoethyl methacrylate, 10 parts of potassium methacrylate, and 12 parts of methyl methacrylate. Then, the inside atmosphere of the polymerization apparatus was displaced with nitrogen, and the temperature was raised to 50° C. Next, 0.08 parts of 2,2'-azobis(2-methylpropionamidine) hydrochloride was added as a polymerization initiator, and the temperature was further raised to 60° C. Simultaneously with the adding of the polymerization initiator, 18 parts of methyl methacrylate was dripped out in 75 minutes and stirred at 60° C. for 6 hours. Then, the temperature was lowered to room temperature. Accordingly, dispersant 1 was obtained as a transparent polymer solution with a solid content of 10%.

[Producing Polymer Particles (A1)]

In a polymerization apparatus equipped with a cooler, thermometer, dripping funnel and mixer, the following were added and stirred to form a homogenous solution: 170 parts of deionized water, 0.2 parts of sodium sulfate, and 0.8 parts of dispersant 1 (solid content of 10%). Next, the following were added and stirred: 16.7 parts of mixture (X2) (10 parts of metal-containing ethylenically unsaturated monomer (a1), 0.8 parts of Uniox PKA 5001, 5 parts of methyl methacrylate, and 0.8 parts of water), 3 parts of methacrylic acid, 62 parts of methyl methacrylate, 4.2 part of Uniox PKA 5001, 15 parts of ethyl acrylate, and 1.5 parts of 1,1,3,3-tetramethylbutyl peroxy-2-ethylhexanoate. After the inside atmosphere of the polymerization apparatus was displaced with nitrogen, the temperature was raised to 80° C. for reactions to take place for one hour.

Next, the temperature was raised to 90° C. and reactions continued for one hour. Then, the temperature was lowered to 40° C. and a water suspension containing the polymer was obtained. The water suspension was filtered through 45-μm openings of a nylon filter cloth, and the filtered suspension was cleansed with deionized water, dehydrated and dried at 40° C. for 16 hours. Accordingly, polymer particles (A1) with a perfect-sphere shape were obtained. The amount of each material, the amount of metal contained in polymer particles (A1) and its solubility in organic solvents are shown in table 2.

[Producing polymer particles (A2) to (A14)]

Polymer particles (A2) to (A14) were produced using the same method as producing polymer particles (A1), and by the amount shown in tables 2 and 3.

TABLE 2

| (part by mass) | | | A1 | A2 | A3 | A4 | A5 | A6 | A7 |
|---|---|---|---|---|---|---|---|---|---|
| monomer mixture (M) | X1 | metal-containing ethylenically unsaturated monomer mixture (a1) | — | — | — | — | 36.4 (water: 2.5) | — | — |
| | | other ethylenically unsaturated monomer (a3) PKA5001 | 16.7 | 33.3 | 66.7 | 100 | | | |
| | | MMA | | | | | 1.8 | | |
| | | metal-containing | | | | | 10.9 | | |
| | X2 | ethylenically unsaturated monomer mixture (a1) | (water: 0.8) | (water: 1.7) | (water: 3.3) | (water: 5.0) | | (water: 4.0) | (water: 1.7) |
| | | other ethylenically unsaturated monomer (a3) PKA5001 | 0.8 | 1.7 | 3.3 | | | | |
| | | MMA | 5 | 10 | 20 | | | | |
| | | metal-containing | | | | 5 | | | |
| | | | | | | 30 | | | |
| | X3 | ethylenically unsaturated monomer mixture (a1) | — | — | — | — | — | 2.7 | 92.3 |
| | | other ethylenically unsaturated monomer (a3) PKA5001 MMA | | | | | | 16 | |
| | | metal-containing | | | | | | 66.7 40 | 2.8 17.5 |
| | X4 | ethylenically unsaturated monomer mixture (a1) PKA5001 MMA | — | — | — | — | — | — | — |
| | | other ethylenically unsaturated monomer (a3) carboxyl-containing ethylenically unsaturated monomer (a2) AA MAA | 3 | 3 | 3 | 3 | 3 | 3 | 3 |
| | | ethylenically unsaturated monomer (a3) MMA | 62 | 47 | 17 | — | 46.1 | 20 | — |
| | | PKA5001 | 4.2 | 3.3 | 1.7 | — | 3.2 | 3.3 | 2.2 |
| | | EA | 15 | 15 | 15 | 2 | 15 | 15 | 14.5 |
| | | (a1) | 10 | 20 | 40 | 60 | 20 | 40 | 60 |
| | | (a2) | 3 | 3 | 3 | 3 | 3 | 3 | 3 |
| | | (a3) | 87 | 77 | 57 | 37 | 77 | 57 | 37 |
| ingredients in monomer mixture (M) (% by mass) | | | | | | | | | |

TABLE 3

| | (part by mass) | | A8 | A9 | A10 | A11 | A12 | A13 | A14 |
|---|---|---|---|---|---|---|---|---|---|
| monomer mixture (M) | X1 | metal-containing ethylenically unsaturated monomer mixture (a1) PKA5001 | — | — | — | 9.1 (water: 0.6) | — | — | — |
| | | other ethylenically unsaturated monomer (a3) MMA | — | — | — | 2.5 | — | — | — |
| | | metal-containing | 33.3 | 33.3 | 33.3 | 3.0 | — | 33.3 | 33.3 |
| | | | 20 | 20 | 20 | 5.0 | — | 20.0 | 20.0 |
| | X2 | ethylenically unsaturated monomer mixture (a1) PKA5001 | (water: 1.7) | (water: 1.7) | (water: 1.7) | — | — | (water: 1.7) | (water: 1.7) |
| | | other ethylenically unsaturated monomer (a3) MMA | 1.7 | 1.7 | 1.7 | — | — | 1.7 | 1.7 |
| | | metal-containing | 10 | 10 | 10 | — | — | 10.0 | 10.0 |
| | X3 | ethylenically unsaturated monomer mixture (a1) PKA5001 | — | — | — | — | 107.7 | — | — |
| | | other ethylenically unsaturated monomer (a3) MMA | — | — | — | — | 70.0 | — | — |
| | | metal-containing | — | — | — | — | (water: 12.9) | — | — |
| | X4 | ethylenically unsaturated monomer mixture (a1) MMA | — | — | — | — | 3.2 | — | — |
| | | PKA5001 | 3 | — | — | — | 20.5 | — | — |
| | | other ethylenically unsaturated monomer (a3) MMA | — | 1 | 5 | 3.0 | 3.0 | — | 10.0 |
| | | carboxyl-containing ethylenically unsaturated monomer (a2) AA | 47 | 49 | 45 | 69.0 | 1.8 | 50.0 | 40.0 |
| | | MAA | 3.3 | 3.3 | 3.3 | 4.5 | 1.5 | 3.3 | 3.3 |
| | | ethylenically unsaturated monomer (a3) MMA | 15 | 15 | 15 | 15.0 | — | 15.0 | 15.0 |
| | | PKA5001 | | | | | | | |
| | | EA | | | | | | | |
| ingredients in monomer mixture (M) (% by mass) | | (a1) | 20 | 20 | 20 | 5 | 70 | 20 | 20 |
| | | (a2) | 3 | 1 | 5 | 3 | 3 | 0 | 10 |
| | | (a3) | 77 | 79 | 75 | 92 | 27 | 80 | 70 |

Examples 1 to 19, Comparative Example 1

The obtained acrylic polymers (P1) to (P2) and polymer particles (A1) to (A14) were combined according to the amounts in tables 4 and 5 using a high-speed disperser to prepare paints. The following additives were added to each paint along with PGM and xylene so that the viscosity of each paint would be 80 to 90 KU when measured using a Stormer viscometer (25° C.). 73 parts of cuprous oxide, 23 parts of triphenylboron, 13 parts of copper pyrithione, 7 parts of colloidal silica, 7 parts of titanium oxide, and 10 parts of copper phthalocyanine.

The amounts of VOC calculated based on the amount of solvent and specific gravity of each of the prepared paints are shown in tables 4 and 5. Also shown are results of testing on paint storage stability, coating consumption, water resistance, drying time, and cross-cut peeling.

TABLE 4

| (part by mass) | | example 1 | 2 | 3 | 4 | 5 | 6 | 7 | 8 | 9 | 10 | 11 |
|---|---|---|---|---|---|---|---|---|---|---|---|---|
| acrylic polymer (P) top: solid content (bottom: total amount) | P1 | — | 50 (90.9) | 50 (90.9) | 50 (90.9) | 50 (90.9) | 50 (90.9) | 50 (90.9) | 50 (90.9) | 50 (90.9) | 50 (90.9) | 50 (90.9) |
| | P2 | 50 (90.9) | — | — | — | — | — | — | — | — | — | — |
| polymer fine particles (A) | type | A1 | A1 | A2 | A3 | A4 | A5 | A6 | A7 | A8 | A9 | A10 |
| | amount | 50 | 50 | 50 | 50 | 50 | 50 | 50 | 50 | 50 | 50 | 50 |
| ingredients in monomer mixture (M) (% by mass) | (a1) | 10 | 10 | 20 | 40 | 60 | 20 | 40 | 60 | 20 | 20 | 20 |
| | (a2) | 3 | 3 | 3 | 3 | 3 | 3 | 3 | 1 | 3 | 1 | 5 |
| | (a3) | 89 | 89 | 77 | 57 | 37 | 77 | 77 | 37 | 77 | 79 | 75 |
| P/A | | 50/50 | 50/50 | 50/50 | 50/50 | 50/50 | 50/50 | 50/50 | 50/50 | 50/50 | 50/50 | 50/50 |
| viscosity adjustment solvent | PGM | 20 | 20 | 20 | 20 | 20 | 20 | 20 | 20 | 20 | 20 | 20 |
| | Xylene | 30 | 50 | 35 | 35 | 35 | 35 | 40 | 35 | 35 | 35 | 35 |
| paint properties | total amount of solvent | 90.9 | 110.9 | 95.9 | 85.9 | 85.9 | 95.9 | 100.9 | 95.9 | 95.9 | 95.9 | 95.9 |
| | specific gravity | 1.2 | 1.2 | 1.2 | 1.2 | 1.2 | 1.2 | 1.2 | 1.2 | 1.2 | 1.2 | 1.2 |
| | VOC | 337 | 387 | 350 | 323 | 323 | 350 | 363 | 350 | 350 | 350 | 276 |
| | viscosity (KU) | 85 | 90 | 84 | 86 | 85 | 81 | 87 | 84 | 90 | 82 | 88 |
| storage stability test | after 3 days | ○ | ○ | ○ | ○ | ○ | ○ | ○ | ○ | ○ | ○ | ○ |
| | after 1 month | ○ | ○ | ○ | ○ | ○ | ○ | ○ | ○ | ○ | ○ | Δ |
| | after 3 months | ○ | ○ | ○ | ○ | ○ | ○ | ○ | ○ | ○ | Δ | Δ |
| coating consumption test | thickness of consumed coating (μm) after 3 months | 9 | 14 | 17 | 20 | 22 | 18 | 12 | 20 | 18 | 17 | 19 |
| | after 6 months | 22 | 31 | 39 | 43 | 48 | 41 | 29 | 45 | 41 | 37 | 40 |
| | average monthly thickness of consumed coating | 3.7 | 5.2 | 6.5 | 7.2 | 8.0 | 6.8 | 4.8 | 7.5 | 6.8 | 6.2 | 6.7 |
| water resistance test | | Δ | ○ | ○ | ○ | Δ | ○ | ○ | Δ | ○ | ○ | ○ |
| coating dryness test (pressure test by model block) | | ○ | ○ | ○ | ○ | ○ | ○ | ○ | ○ | ○ | ○ | ○ |
| cross-cut test (adhesion) | | Δ | ○ | ○ | ○ | ○ | ○ | ○ | ○ | ○ | ○ | ○ |

TABLE 5

| (part by mass) | | example 12 | 13 | 14 | 15 | 16 | 17 | 18 | 19 | comparative 1 |
|---|---|---|---|---|---|---|---|---|---|---|
| acrylic polymer (P) top: solid content (bottom: total | P1 | 95 (172.7) | 90 (163.6) | 30 (54.5) | 20 (36.4) | 50 (90.9) | 50 (90.9) | 50 (90.9) | 50 (90.9) | 100 (181.8) |
| | P2 | — | — | — | — | — | — | — | — | — |
| polymer fine particles (A) | type | A3 | A3 | A3 | A3 | A11 | A12 | A13 | A14 | — |
| | amount | 5 | 10 | 70 | 80 | 50 | 50 | 50 | 50 | — |
| ingredients in monomer mixture (M) (% by mass) | (a1) | 40 | 40 | 40 | 40 | 5 | 70 | 20 | 20 | — |
| | (a2) | 3 | 3 | 3 | 3 | 3 | 1 | 0 | 10 | — |
| | (a3) | 57 | 57 | 57 | 57 | 92 | 29 | 80 | 70 | — |
| P/A | | 95/5 | 90/10 | 30/70 | 20/80 | 50/50 | 50/50 | 50/50 | 50/50 | 100/0 |
| viscosity adjustment solvent | PGM | 20 | 20 | 20 | 20 | 20 | 20 | 20 | 20 | 20 |
| | Xylene | 15 | 15 | 35 | 45 | 80 | 35 | 35 | 60 | 15 |
| paint properties | total amount of solvent | 112.7 | 108.6 | 79.5 | 81.4 | 140.9 | 90.9 | 95.9 | 120.9 | 116.8 |
| | specific gravity | 1.2 | 1.2 | 1.2 | 1.2 | 1.2 | 1.2 | 1.2 | 1.2 | 1.2 |
| | VOC | 391 | 382 | 305 | 311 | 452 | 350 | 350 | 410 | 401 |
| | viscosity (KU) | 90 | 87 | 85 | 80 | 90 | 80 | 80 | 90 | 88 |
| storage stability test | after 3 days | ○ | ○ | ○ | ○ | ○ | ○ | ○ | Δ | ○ |
| | after 1 month | ○ | ○ | ○ | ○ | ○ | ○ | Δ | X | ○ |
| | after 3 months | ○ | ○ | ○ | ○ | ○ | ○ | X | X | ○ |
| coating consumption test | thickness of consumed coating (μm) after 3 months | 18 | 18 | 21 | 22 | 8 | 20 | 17 | 21 | 18 |
| | after 6 months | 34 | 35 | 42 | 46 | 15 | 45 | 35 | 43 | 34 |
| | average monthly thickness of consumed | 5.6 | 5.8 | 7.0 | 7.7 | 2.5 | 7.5 | 5.8 | 7.2 | 5.7 |
| water resistance test | | Δ | ○ | ○ | Δ | ○ | X | Δ | ○ | X |
| coating dryness test (pressure test by model block) | | Δ | ○ | ○ | ○ | ○ | ○ | ○ | ○ | X |
| cross-cut test (adhesion) | | ○ | ○ | ○ | Δ | ○ | Δ | ○ | Δ | Δ |

Abbreviations in tables are the following compounds respectively:
PKA 5001: polyethylene glycol allyl ether (brand name: Uniox PKA 5001, made by NOF Corporation)
MMA: methyl methacrylate
MAA: methacrylic acid
AA: acrylic acid
EA: ethyl acrylate
PGM: propylene glycol monomethyl ether
VOC: volatile organic compound As shown in tables 4 and 5, comparative example 1 which does not contain polymer particles (A) showed low results in both water resistance and drying time tests. By contrast, examples 1 to 19 show excellent results in either water resistance testing or drying time testing or in both of them.

Industrial Applicability

Since the antifouling paint resin composition according to an embodiment of the present invention has excellent dispersion properties of polymer particles in paint, storage stability of the paint is excellent and it is suitable for producing a high-solid antifouling paint with a shorter drying time because of capillary action among the polymer particles. Moreover, since self-polishing characteristics, water resistance, drying time and adhesion of a coating film of the antifouling paint in seawater are excellent, it is very useful when applied toward industrial purposes.

The invention claimed is:

1. An antifouling paint composition, comprising:
   metal-containing polymer particles that are present as particles in the antifouling paint composition;
   an organic solvent; and
   an acrylic polymer that is dissolved in the organic solvent with no agglomeration and that is obtained by polymerizing a monomer mixture which comprises 50% by mass or more of (meth)acrylic monomer.

2. The antifouling paint composition according to claim 1, wherein the metal-containing polymer particles comprise a divalent or higher-valent metal ester structure.

3. The antifouling paint composition according to claim 1, wherein the metal-containing polymer particles are such polymer particles that are produced by polymerizing an ethylenically unsaturated monomer mixture comprising: (a1) 8 to 65% by mass of divalent or higher-valent metal-containing ethylenically unsaturated monomer; (a2) 0.5 to 8% by mass of carboxyl group-containing ethylenically unsaturated monomer; and (a3) 27 to 91.5% by mass of other ethylenically unsaturated monomer.

4. The antifouling paint composition according to claim 1, wherein the mass ratio of the metal-containing polymer particles to the acrylic polymer is in a range of 10/90 to 70/30.

5. The antifouling paint composition according to claim 1, wherein the acrylic polymer comprises a divalent metal ester structure.

6. The antifouling paint composition according to claim 5, wherein the acrylic polymer is obtained by polymerizing an ethylenically unsaturated monomer mixture that comprises a divalent metal-containing ethylenically unsaturated monomer.

7. An antifouling paint comprising the antifouling paint composition according to claim 1.

8. The antifouling paint composition according to claim 3, wherein a content of the divalent or higher-valent metal-containing ethylenically unsaturated monomer in the ethylenically unsaturated monomer mixture is from 15 to 55% by mass.

9. The antifouling paint composition according to claim 3, wherein a content of the carboxyl group-containing ethylenically unsaturated monomer in the ethylenically unsaturated monomer mixture is from 2 to 4% by mass.

10. The antifouling paint composition according to claim 3, wherein a content of the other ethylenically unsaturated monomer in the ethylenically unsaturated monomer mixture is from 41 to 83% by mass.

11. The antifouling paint composition according to claim 1, wherein the metal-containing polymer particles are zinc salts of acid group-containing acrylic copolymers.

12. The antifouling paint composition according to claim 1, wherein the organic solvent includes a hydrocarbon, an ether, an ester, a ketone, or an alcohol.

13. The antifouling paint composition according to claim 1, wherein the mass ratio of the acrylic polymer to the organic solvent is in a range of 30/70 to 80/20.

14. The antifouling paint composition according to claim 1, wherein the mass ratio of the acrylic polymer to the organic solvent is in a range of 40/60 to 70/30.

* * * * *